United States Patent
Wang et al.

(10) Patent No.: US 9,674,499 B2
(45) Date of Patent: Jun. 6, 2017

(54) COMPATIBLE THREE-DIMENSIONAL VIDEO COMMUNICATIONS

(71) Applicant: QUALCOMM Incorporated, San Diego, CA (US)

(72) Inventors: Ye-Kui Wang, San Diego, CA (US); Thomas Stockhammer, Bergen (DE); Nikolai Konrad Leung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 13/964,877

(22) Filed: Aug. 12, 2013

(65) Prior Publication Data
US 2014/0049603 A1  Feb. 20, 2014

Related U.S. Application Data

(60) Provisional application No. 61/683,686, filed on Aug. 15, 2012.

(51) Int. Cl.
*H04N 13/00* (2006.01)
*H04N 19/597* (2014.01)
*H04N 19/46* (2014.01)

(52) U.S. Cl.
CPC ..... *H04N 13/0003* (2013.01); *H04N 13/0007* (2013.01); *H04N 13/0029* (2013.01);
(Continued)

(58) Field of Classification Search
CPC ........... H04N 13/0003; H04N 13/0066; H04N 13/0029; H04N 13/0048; H04N 13/0059; H04N 13/0007
See application file for complete search history.

(56) References Cited

U.S. PATENT DOCUMENTS

| | | | |
|---|---|---|---|
| 7,808,988 B2* | 10/2010 | Neff | H04L 29/06027 370/352 |
| 2006/0023802 A1* | 2/2006 | Balakrishnan | H03M 13/2936 375/265 |

(Continued)

FOREIGN PATENT DOCUMENTS

| | | |
|---|---|---|
| WO | 2012091640 A1 | 7/2012 |
| WO | 2013030458 A1 | 3/2013 |

OTHER PUBLICATIONS

Bross B., et al., "High Efficiency Video Coding (HEVC) text specification draft 10 (for FDIS & Consent)," JCTVC-L1003-v9, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 332 Pages.

(Continued)

*Primary Examiner* — Robert Hance
(74) *Attorney, Agent, or Firm* — Knobbe, Martens, Olsen & Bear, LLP

(57) ABSTRACT

Information for a video stream indicating whether the video stream includes stereoscopic three-dimensional video data can be provided to a display device. This information allows the device to determine whether to accept the video data and to properly decode and display the video data. This information can be made available for video data regardless of the codec used to encode the video. Systems, devices, and methods for transmission and reception of compatible video communications including stereoscopic three-dimensional picture information are described.

24 Claims, 7 Drawing Sheets

(52) U.S. Cl.
CPC ..... *H04N 13/0048* (2013.01); *H04N 13/0059* (2013.01); *H04N 13/0066* (2013.01); *H04N 19/46* (2014.11); *H04N 19/597* (2014.11)

(56) References Cited

U.S. PATENT DOCUMENTS

| | | | | |
|---|---|---|---|---|
| 2010/0226443 | A1* | 9/2010 | Citta | H04N 21/234327 375/240.26 |
| 2011/0280316 | A1* | 11/2011 | Chen | H04N 13/0048 375/240.25 |
| 2012/0020413 | A1* | 1/2012 | Chen | H04N 19/597 375/240.26 |
| 2012/0027075 | A1 | 2/2012 | Kamio | |
| 2012/0212579 | A1 | 8/2012 | Froejdh et al. | |
| 2013/0235152 | A1* | 9/2013 | Hannuksela | H04N 19/00769 348/43 |
| 2013/0275615 | A1* | 10/2013 | Oyman | H04L 65/60 709/231 |
| 2015/0049814 | A1* | 2/2015 | Sung | H04N 19/597 375/240.16 |

OTHER PUBLICATIONS

Vetro A., et al., "Overview of the Stereo and Multiview Video Coding Extensions of the H.264/MPEG-4 AVC Standard," Proceedings of the IEEE, 2011, vol. 99 (4), pp. 626-642.
International Search Report and Written Opinion—PCT/US2013/054791—ISA/EPO—Nov. 11, 2013.
Nokia: "Proposed MVC related conclusions for TR 26.905," 3GPP Draft; S4-120753, 3rd Generation Partnership Project (3GPP), Mobile Competence Centre 650, Route des Lucioles, F-06921 Sophia-Antipolis Cedex; France, vol. SA WG4, No. Erlangen, Germany; May 21, 2012-May 25, 2012, May 22, 2012 (May 22, 2012), XP050639437; 1 page.

* cited by examiner

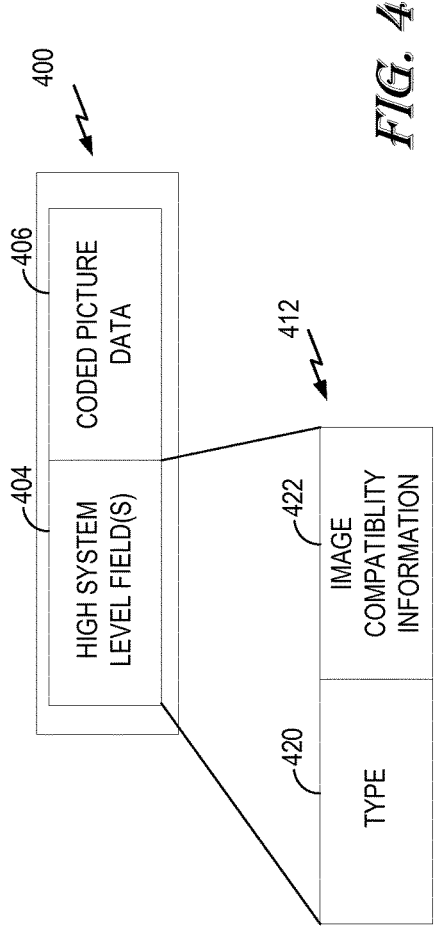
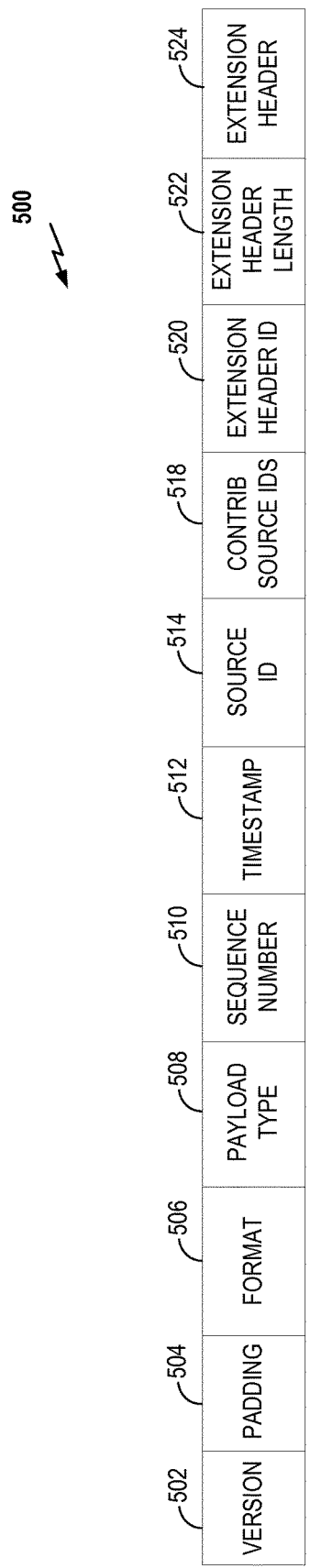
FIG. 4
FIG. 5

COMPATIBLE THREE-DIMENSIONAL VIDEO COMMUNICATIONS

CROSS-REFERENCE TO RELATED APPLICATIONS

This application claims priority benefit under 35 U.S.C. §119(e) to U.S. Provisional Application No. 61/683,686, filed on Aug. 15, 2012, entitled "Support For Frame-Packed Stereoscopic 3D Video," the disclosure of which is hereby incorporated herein by reference in its entirety. Any and all priority claims identified in the Application Data Sheet, or any correction thereto, are hereby incorporated by reference under 37 C.F.R. §1.57.

BACKGROUND

Field

The present invention relates to video communication, more specifically transmission and reception of compatible video communications including stereoscopic three-dimensional picture information.

Background

A wide range of electronic devices, including mobile wireless communication devices, personal digital assistants (PDAs), laptop computers, desktop computers, digital cameras, digital recording devices, and the like, have an assortment of image and video display capabilities. Some devices are capable of displaying two-dimensional (2D) images and video, three-dimensional (3D) images and video, or both.

The video information may be transmitted using one or more of a variety of video coding processes. Some popular video coding processes include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extension, and ITU-T H.265 (also known as ISO/IEC MPEG-H HEVC). In some instances, images or video may be transmitted to a device that has certain 3D capabilities.

The coded video may be stored in file in a memory for display. Example file formats include ISO base media file format (ISOBMFF, ISO/IEC 14496-12) and other derived from the ISOBMFF, including MPEG-4 file format (ISO/IEC 14496-14), 3GPP file format (3GPP TS 26.244) and AVC/HEVC file format (ISO/IEC 14496-15).

To transport the video, in coded and/or file formats, from a source device to a display device, a multimedia transport service may be used. Example multimedia services include 3GPP dynamic adaptive streaming over HTTP (3GP-DASH, 3GPP TS 26.247), packet-switched streaming (PSS, 3GPP TS 26.234), multimedia broadcast and multicast service (MBMS, 3GPP TS 26.346) and multimedia telephone service over IMS (MTSI, 3GPP TS 26.114).

With this panoply of standards that a given device will be able to receive and display media coded according to a specific format is not guaranteed. For example, a device capable of rendering two-dimensional video data may attempt to access stereoscopic three-dimensional video data. Similarly, while a device may be configured to render one form of stereoscopic three-dimensional video data, it may be unable to render a second form of stereoscopic three-dimensional video data.

Therefore, it is desirable to provide systems and methods for compatible communication of stereoscopic three-dimensional video data.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include compatible communication of stereoscopic three-dimensional video data.

In one innovative aspect, a device for coding video information is provided. The device includes a memory. The memory is configured to store at least a portion of the video information. The video information includes image data. The device also includes a processor in communication with the memory. The processor is configured to receive at least a portion of the video information from the memory. The processor is also configured to determine compatibility information associated with the image data. The compatibility information is encoded in a first portion of the video information. The image data is encoded in a second portion of the video information. The compatibility information provided indicates whether the image data includes frame-packed stereoscopic three dimensional video. The processor is further configured to process the video information based on the determined compatibility information.

In another innovative aspect, a method of encoding video information is provided. The method includes receiving video information. The method further includes generating, via a processor of an electronic device, compatibility information for the video information. The compatibility information indicates whether video information includes frame-packed stereoscopic three-dimensional data. The method also includes generating a message for transmission to a destination device. The message includes, in a first portion, the compatibility information and further includes, in a second portion, the video information.

In a further innovative aspect, a method of decoding video information is provided. The method includes receiving a message from a source device. The message includes, in a first portion, compatibility information. The message further includes, in a second portion, the video information. The compatibility information included in the message indicates whether said video information in the message includes frame-packed stereoscopic three dimensional video.

In yet another innovative aspect, a non-transitory computer-readable medium comprising instructions executable by a processor of a device is provided. The instructions cause the device to receive video information including image data. The instructions cause the device to determine compatibility information associated with the image data. The compatibility information is encoded in a first portion of the video information. The image data is encoded in a second portion of the video information. The compatibility information indicates whether the image data includes frame-packed stereoscopic three dimensional data. The instructions further cause the device to process the video information based on the determined compatibility information.

Another device for coding video information is provided in a further innovative aspect. The device includes means for receiving video information. The video information includes image data. The device includes means for determining compatibility information associated with the image data. The compatibility information is encoded in a first portion of the video information. The image data is encoded in a second portion of the video information. The compatibility information indicates whether the image data includes frame-packed stereoscopic three dimensional data. The device also includes means for processing the video information. The video information is processed based on the determined compatibility information.

These and other implementations consistent with the invention are further described below with reference to the following figures.

BRIEF DESCRIPTION OF THE DRAWINGS

FIG. 4 illustrates a message diagram for an exemplary message encoding which provides image encoding compatibility information.

FIG. 5 illustrates a message diagram for a further exemplary encoding of image compatibility information.

Figure 1:
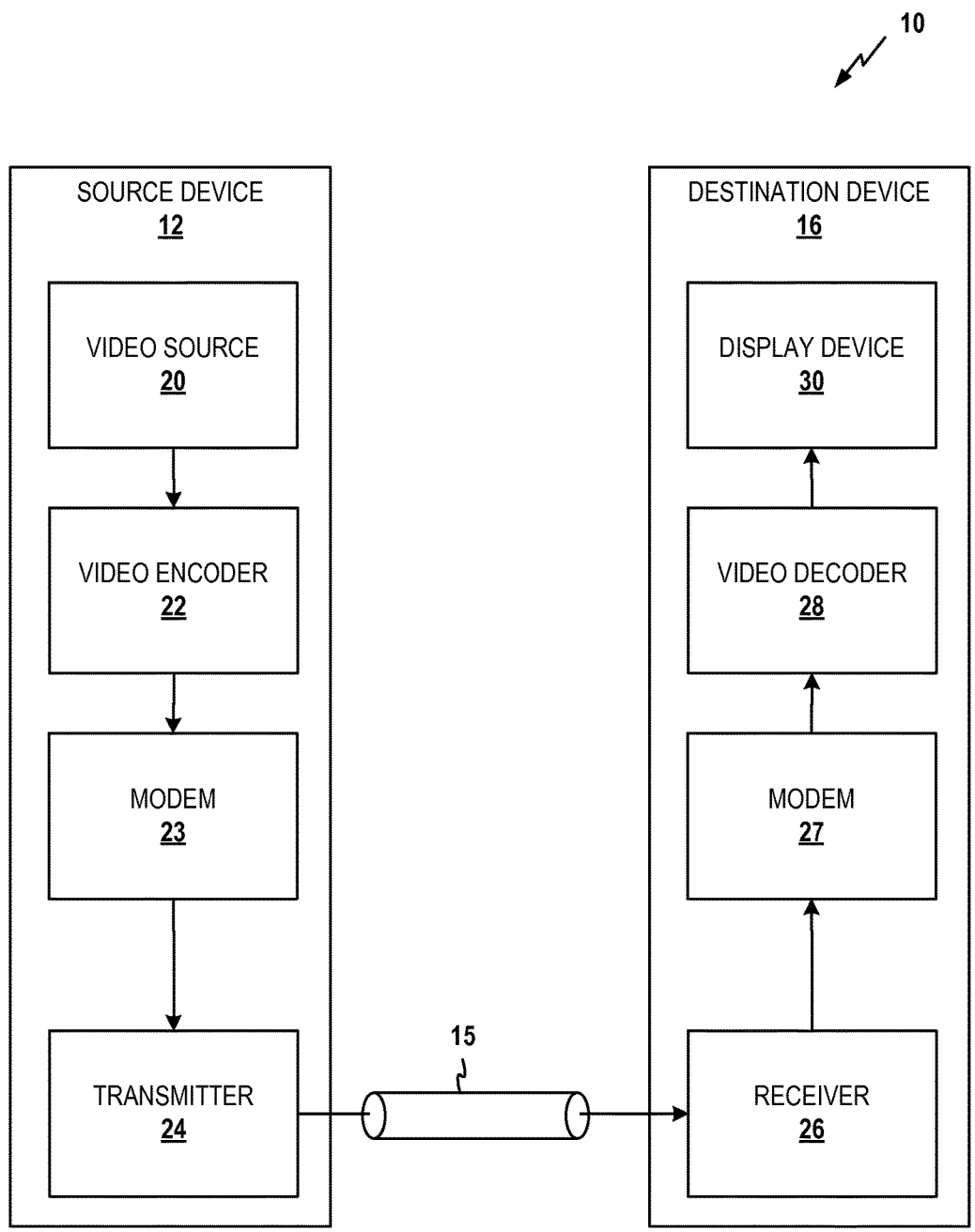
FIG. 1 illustrates a functional block diagram of an exemplary video encoding and decoding system.

In the figures, to the extent possible, elements having the same or similar functions have the same designations.

DETAILED DESCRIPTION

Information for a video stream indicating whether the video stream includes stereoscopic three-dimensional video data can be provided to a display device. This information allows the device to determine whether to accept the video data and to properly decode and display the video data. This information can be made available for video data regardless of the codec used to encode the video. A generic solution that is independent of the codec used to encode the data is desirable.

For example, implementations supporting frame-packed stereoscopic 3D video in 3GPP file format, 3GP-DASH, PSS, and MBMS may not be backward compatible to legacy devices implemented according to earlier 3GPP releases (e.g., release 10) of the specifications. These devices may receive, decode, and render a frame-packed stereoscopic 3D video bit-stream as if it was a 2D video bit-stream. This may produce a picture having a lower visual quality level than if the bit-stream were decoded and rendered as a frame-packed stereoscopic 3D video bit-stream.

Consider also, devices implemented according to newer 3GPP releases (e.g., Release 11) but which are not configured to support frame-packed stereoscopic 3D video. Such devices cannot easily identify whether a video content is a frame-packed stereoscopic 3D video. Accordingly, the decision as to whether to accept or reject the content can be complicated, inefficient, and resource intensive.

Embodiments described include systems and methods which include an indication as to whether frame-packed stereoscopic 3D video is included in a given communication at a high system level (e.g., transport layer, sequence layer, bit-stream layer), such as in session description protocol (SDP) for real-time transport protocol (RTP) based packet switch stream (PSS) streaming. The indication allows devices, including legacy devices, to easily decide whether to accept or reject the content. The decision can be made without having to unpack the entire video message thereby saving device and network resources.

Sequence layer and bit-stream layer generally refer to a group of images included in the image data. For example, a sequence may refer to a group of frames of image data. A value included at the sequence layer may be applied for each member of the group. By identifying compatibility at the sequence or bit-stream layer, the constituent components of the bit-stream or sequence need not be decoded or otherwise processed to determine whether they include frame-packed stereoscopic three-dimensional data.

Embodiments of the systems and methods described herein include backward compatible support of frame-packed stereoscopic three-dimensional (3D) video. For example, in systems implemented according to H.264/AVC or HEVC, frame-packed stereoscopic 3D video is indicated via a frame packing arrangement service extension information (SEI) message. This message is included in the video data, e.g. payload, of a received video transmission. Accordingly, to determine whether the video data includes the 3D information, a receiving device may obtain and decode the received video data only to discover the receiving device cannot decode the video. The process of obtaining and decoding may cause the receiving device to expend valuable resources such as power, bandwidth, processing cycles, time, and the like. Allowing the receiving device to identify the type of information included in the payload can help save these resources.

A further non-limiting advantage of the described aspects is that devices which are configured to handle certain stereoscopic 3D video data can identify video data including the 3D information sooner. This has a benefit of allowing the device to make an early determination that the received video includes 3D information and to adjust for decoding and rendering such data. For example, the device may include a configurable decoding pipeline which can be dynamically adjusted to decode according to the received video data. This allows a general decoder to be implemented which can handle video data encoded via a variety of codes and/or stored in multiple formats.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and messages may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

FIG. 1 illustrates a functional block diagram of an exemplary video encoding and decoding system. As shown in FIG. 1, system 10 includes a source device 12 that may be configured to transmit encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. Source devices may also include set-top boxes, consoles (e.g., gaming console, DVD/Blu-ray console), digital video receivers/recorders, tablet computers, handheld gaming consoles, and the like. However, the techniques of this disclosure, which concern compatible frame-packed stereoscopic three-dimensional data communications, may be used in many different systems and settings. FIG. 1 is merely one example of such a system.

In the example of FIG. 1, the source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode a sequence of pictures. The video encoder 22 may be configured to encode additional information associated with the pictures such as 3D conversion information including a set of parameters that can be applied to each of the video pictures to generate 3D video data. Modem 23 and transmitter 24 may modulate and transmit wireless signals to destination device 16. In this way, source device 12 communicates the encoded sequence of pictures along with any additional associated information to destination device 16.

Receiver 26 and modem 27 receive and demodulate wireless signals received from source device 12. Accordingly, video decoder 28 may receive the sequence of pictures. The video decoder 28 may also receive the additional information which can be used for decoding the coded sequence of pictures.

Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. As part of the encoding process, the video encoder 22 may be configured to implement one or more of the methods described herein, such as generating compatible frame-packed stereoscopic three-dimensional data communications for the video.

The encoded video information may then be modulated by a modem 23 according to a communication standard, e.g., such as code division multiple access (CDMA) or another communication standard, and transmitted to destination device 16 via transmitter 24. The encoded video information may include the picture orientation information. The modem 23 may include various mixers, filters, amplifiers or other components designed for signal modulation. The transmitter 24 may include circuits designed for transmitting data, including amplifiers, filters, and one or more antennas.

Receiver 26 of destination device 16 may be configured to receive information over channel 15. A modem 27 may be configured to demodulate the information. The video encoding process may implement one or more of the techniques described herein to include image compatibility information. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, and Advanced Video Coding (AVC), or the next-generation video coding standard named High Efficiency Video Coding (HEVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video pictures. Video encoder 22 and video decoder 28 may operate on video blocks within individual video pictures in order to encode and decode the video data. The video blocks may have fixed or varying sizes, and may differ in size according to a specified coding standard. Each video picture may include a series of slices or other independently decodable units. Each slice may include a series of macroblocks or other video blocks such as coding tree units, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Macroblocks, coding tree units, or other video blocks may be grouped into independently decodable units such as slices, slice groups, tiles, or other independent units. Macroblocks, coding tree units, or other video blocks may be grouped into dependently decodable units such as dependent slices, entropy slices, wavefront parallel processing waves, or other dependent units. Each slice may be an independently decodable unit of a video picture. Alternatively, pictures themselves may be decodable units, or other portions of a picture may be defined as decodable units. In this disclosure, the term "coded unit" refers to any independently decodable unit of a video picture such as an entire picture, a slice of a picture, or another independently decodable unit defined according to the coding techniques used.

Figure 2:
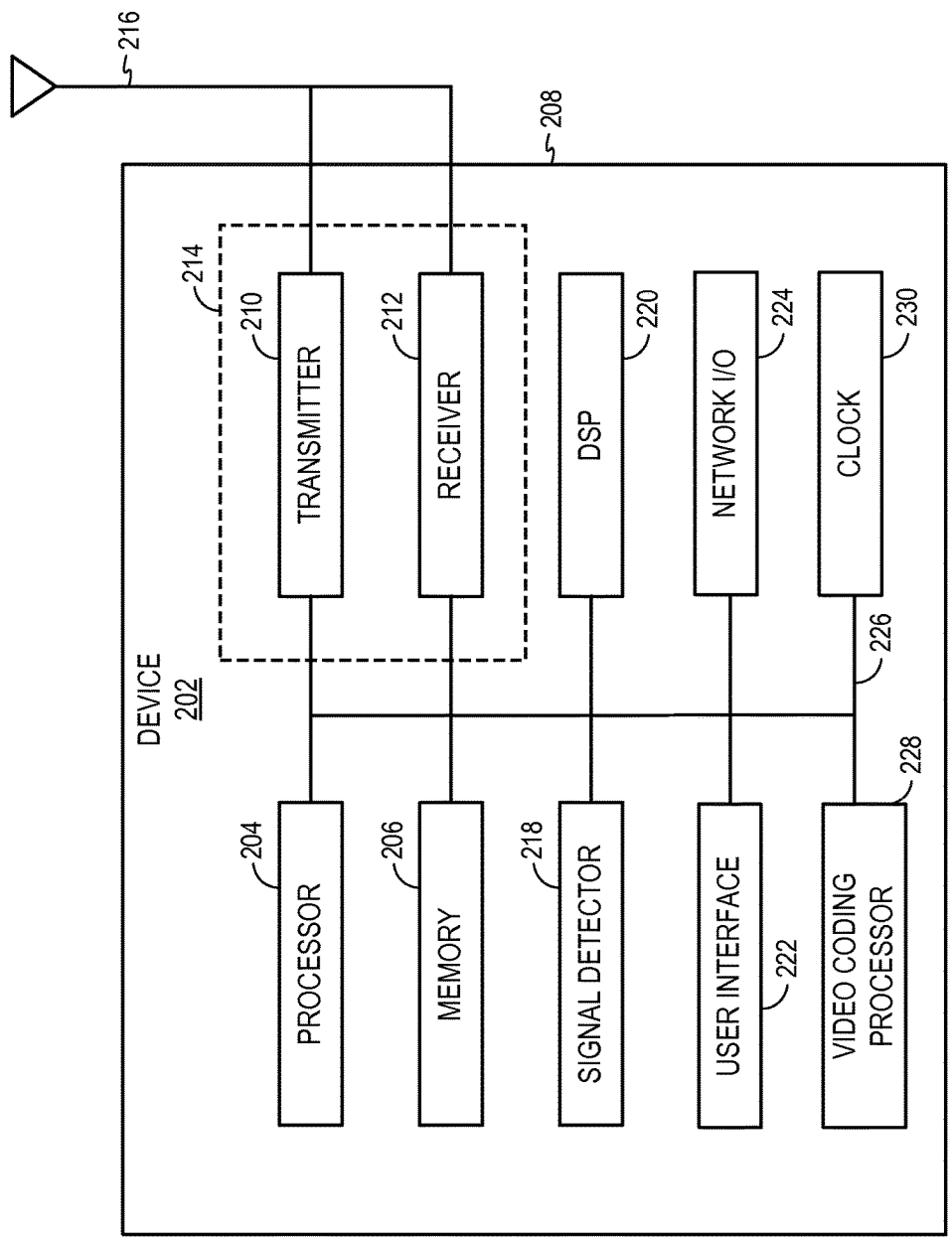
FIG. 2 shows a functional block diagram of an exemplary video processing device.

FIG. 2 shows a functional block diagram of an exemplary video processing device. The device 202 is an example of a device that may be configured to implement the various methods described herein. For example, the device 202 may be implemented as the source device 12 or the destination device 16.

The device 202 may include processor unit(s) 204 which control operation of the device 202. One or more of the processor unit(s) 204 may be collectively referred to as a central processing unit (CPU). Memory 206, which may include both read-only memory (ROM) and random access memory (RAM), provides instructions and data to the processor units 204. The memory 206 may generally be implemented as a computer readable storage medium. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 include a DSP, the DSP may be configured to generate a packet (e.g., a data packet) for transmission. In some aspects, the packet may comprise a physical layer data unit (PPDU).

The device 202 may also include machine-readable media for storing software. The processing unit(s) 204 may comprise one or more non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the device 202 to perform the various functions described herein.

The device 202 may include a transmitter 210 and/or a receiver 212 to allow transmission and reception, respectively, of data between the device 202 and a remote location. The transmitter 210 and receiver 212 may be combined into a transceiver 214. An antenna 216 may be attached to the housing 208 and electrically coupled with the transceiver 214. The device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets to be transmitted are provided to the transmitter 201. For example, the processor unit(s) 204 may store a packet in the memory 206 and the transmitter 201 may be configured to retrieve the packet. Once the transmitter retrieves the packet, the transmitter 201 transmits the packet to via the antenna 216. In some implementations, the transmitter 201 may transmit the packet via a network input/output 224.

If the device 202 is implemented as a destination device 16, the antenna 216 detects wirelessly transmitted packets/signals. The receiver 212 may be configured to process the detected packets/signals and make them available to the processor unit(s) 204. For example, the receiver 212 may store the packet in memory 206 and the processor unit(s) 204 may be configured to retrieve the packet.

The device 202 may also include a signal detector 218 that may be used in an effort to detect and quantify the level of signals received by the transceiver 214. The device 202 may also include a digital signal processor (DSP) 220 for use in processing signals. The DSP 220 may be configured to generate a packet for transmission. In some aspects, the packet may comprise a physical layer data unit (PPDU).

The device 202 may further comprise a user interface 222 in some implementations. The user interface 222 may comprise a keypad, a microphone, a speaker, and/or a display. In some implementations, the device 202 may be coupled with a display. For example, the device 202 may be implemented as a set-top-box which receives video information, processes the information for display, and transmit the information to a television for display. The user interface 222 may further include any element or component that conveys information to a user of the device 202 and/or receives input from the user. The device 202 may also include a housing 208 surrounding one or more of the components included in the device 202.

The device 202 may include a video coding processor 228. When implemented as a source device 12, the video coding processor 228 may be configured to receive video data such as from one or more cameras or other image capturing device(s). The video coding processor 228 may include an encoder, such as the video encoder 22 discussed above or the encoding device shown and described below in reference to FIG. 3. The video coding processor 228 may be configured to include image compatibility information in multimedia streams/files generated by the device 202.

When implemented as a destination device 16, the video coding processor 228 may be configured to receive and decode the multimedia data and provide the data for presentation. The video coding processor 228 may include a decoder, such as the video decoder 28 described above or the decoding device shown described below in reference to FIG. 6. The video coding processor 228 included in a destination device 16 may be configured to identify multimedia data including stereoscopic three-dimensional data and adjust the processing of such data. In some implementations, the adjustment includes rejecting the multimedia data and terminating subsequent transfers thereof. In some implementations, the adjustment includes configuring the decoder to execute a decoding process compatible with identified image compatibility information.

The device 202 may include a clock 230. The clock 230 may be configured to identify a point in time. The clock 230 may identify absolute points in time (e.g., specific date and time information). The clock 230 may be configured to identify relative points in time (e.g., points in a multimedia presentation). The clock 230 may be coupled with the capture sensor included in a source device 12. The clock 230 may provide time information at various points of video capture. This time information may be included in the video information transmitted to the destination device 16.

The various components of the device 202 may be coupled together by a bus system 226. The bus system 226 may include a data bus, for example, as well as a power bus, a control signal bus, and a status signal bus in addition to the data bus. Those of skill in the art will appreciate the components of the device 202 may be coupled together or accept or provide inputs to each other using some other mechanism.

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. Further, each of the components illustrated in FIG. 2 may be implemented using a plurality of separate elements.

Figure 3:
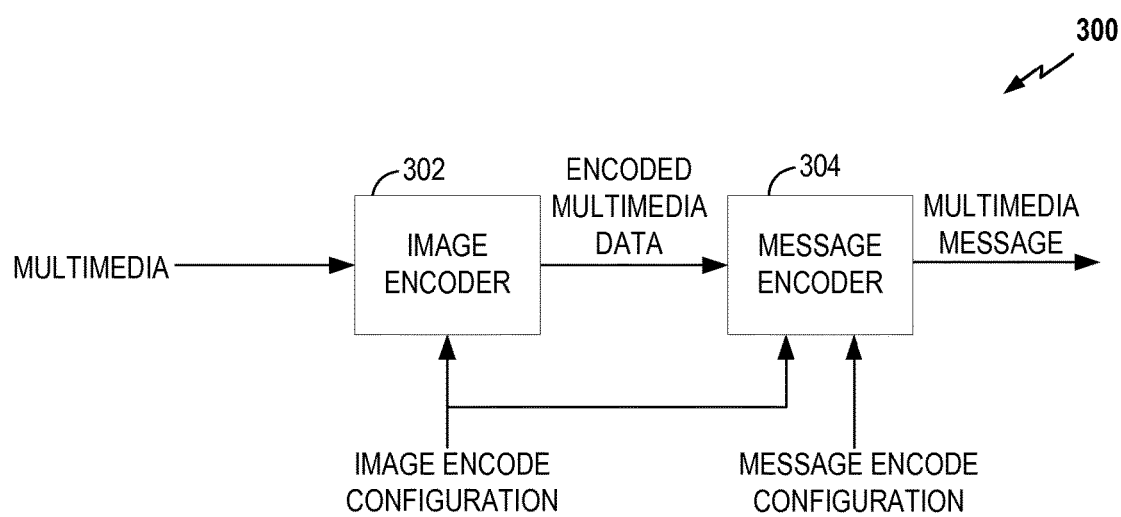
FIG. 3 illustrates a functional block diagram of an exemplary encoding device.

FIG. 3 illustrates a functional block diagram of an exemplary encoding device. The encoding device 300 shown in FIG. 3 receives multimedia information as one input. The multimedia information includes the video and audio information. If the multimedia includes three-dimensional video, two views may be included (e.g., a left view and a right view).

The encoding device 300 includes an image encoder 302. The image encoder 302 shown receives the multimedia data and generates an encoded version of the multimedia data/stream. The image encoder 302 may also receive an image encode configuration input. The image encode configuration input may identify the encoding scheme to be applied. The image encode configuration input may be provided once and used for all multimedia streams. The image encode configuration input may be dynamic and provided for each multimedia stream or for each portion of a multimedia stream. In a dynamic configuration, the image encode configuration may be selected based at least in part on the multimedia information, one or more characteristics (e.g., power, processing capabilities, load) of the source device 12, one or more characteristics (e.g., power, processing capabilities, load, coupling with source device) of the destination device 16, and/or other information available to the source device 12.

The image encoder 302 may be configured to apply the identified encoding scheme to multimedia information to generate an encoded version of the multimedia data. In some implementations, the encoded version of the multimedia data may be further processed by the source device 12 (e.g., encrypted, compressed).

As one image encoding format, consider the AVC file format. An AVC file includes a profile compatibility field. In some implementations, a field of the profile compatibility field may be used to indicate whether the video bit-stream to which the sample entry applies contains frame packing arrangement SEI messages. As one example, bit 7 (e.g., the most significant bit) of the second byte in profile_compatibility may be set to 1 to indicates that the video bit-stream to which the sample entry applies contains frame packing arrangement SEI messages. In such an implementation, if the value is set to 0, the field indicates that the video bit-stream to which the sample entry applies does not contain frame packing arrangement SEI messages. Alternatively, the value equal to 1 indicates that the video bit-stream to which the sample entry applies may contain frame packing arrangement SEI messages. When the video bit-stream to which the sample entry applies contains at least one frame packing arrangement SEI message, bit 7 (the most significant bit) of the second byte in profile_compatibility can be set to 1.

3GPP file format is another example image encoding format which the image encoder 302 may be configured to perform. The 3GPP file format includes a sample entry type for each sample. When the sample entry type is a type associated with AVC such as 'avc1', 'avc2', 'avc3', or 'avc4', a value may be included in the profile compatibility field for the sample indicating whether the sample entry applies contains frame packing arrangement SEI messages. For example, a profile compatibility value of 1 may indicate that the video bit-stream to which the sample entry applies contains frame packing arrangement SEI messages as specified in H.264/AVC. The value equal to 0 indicates that the video bit-stream to which the sample entry applies does not contain frame packing arrangement SEI messages. Alternatively, the value equal to 1 indicates that the video bit-stream to which the sample entry applies may contain frame packing arrangement SEI messages. When the video bit-stream to which the sample entry applies contains at least one frame packing arrangement SEI message, bit 7 (the most significant bit) of the second byte in profile_compatibility may be set to 1.

By these two examples, it should be noted that the identifier for whether the multimedia data includes stereoscopic three-dimensional data is included in the encoded multimedia data.

The encoded multimedia data is provided to the message encoder 304. The message encoder 304 may generate a multimedia message including the encoded multimedia data.

The message encoder 304 may receive a message encode configuration. The message encode configuration may indicate how the multimedia message is to be generated and/or transmitted. For example, the message encode configuration may indicate the transport protocol for the encoded multimedia. Based on this information, the message encoder 304 may generate the multimedia message such that an indication as to whether the encoded multimedia data includes stereoscopic three-dimensional data is included in a transport layer portion of the multimedia message and the encoded multimedia data is included in a second portion (e.g., payload) of the multimedia message. The message encoder 304 may include the indication based on the image encode configuration which may also be received by the message encoder 304. In some implementations, the message encoder 304 may determine whether the encoded multimedia data includes stereoscopic three-dimensional data by decoding or otherwise processing the encoded multimedia data.

The message encode configuration input may be provided once and used for all multimedia streams. The message encode configuration input may be dynamic and provided for each multimedia stream or for each portion of a multimedia stream. In a dynamic configuration, the message encode configuration may be selected based at least in part on the multimedia information, one or more characteristics (e.g., power, processing capabilities, load) of the source device 12, one or more characteristics (e.g., power, processing capabilities, load, coupling with source device) of the destination device 16, and/or other information available to the source device 12.

In one implementation, the encoding of the message encoder 304 may include a value indicating the presence of stereoscopic three-dimensional data in a first portion and the image/video data in a second portion. For example, the value indicating the presence of stereoscopic three-dimensional data may be included in a transport layer header field distinct from the image data payload. This can provide faster identification of stereoscopic three-dimensional video data without the need to decode the image data to identify the type of video data received.

The message encoder 304 may be configured to generate compatible dynamic adaptive streaming over HTTP (DASH) messages. DASH messages include a field which specifies the media type included in the streaming presentation. For example, a codecs attribute within an XML file may be used to specify the media type(s). The media type field (e.g., codec) can include a profile and level information for the media type specified. In some implementations, the contents of the codec attribute conform to either the simplist or fancy-list productions of RFC6381 clause 3.2. In some instance, the attribute may be specified without the enclosing DQUOTE characters. The codec identifier for the media format, mapped into the name space for codecs as specified in RFC6381 clause 3.3 can be used in some implementations.

The value of the media type field (e.g., codec attribute) may include a value indicating an AVC profile. In such instances, if the video stream contains at least one frame packing arrangement SEI message, the value may include a value indicating the frame packing arrangement within the attribute. For example, bit 7 (e.g., the most significant bit) of the second byte of the second element of media type field (e.g., codec attribute) can be set to 1 and otherwise the bit is set to 0.

FIG. 4 illustrates a message diagram for an exemplary message encoding which provides image encoding compatibility information. In some implementations, the image encoding compatibility information may be included in-band with the video data. In such implementations, the image encoding compatibility information is transmitted along with the video data in the message 400.

The picture information (e.g., image) may be transmitted via a coded picture field 406 included in the message 400. The message 400 may also include one or more high system level fields 404. One example of a high system level field is a transport layer header is an image compatibility information header 412. The image compatibility information header 412 may include a type field 420. The type field 420 may include a value identifying the header type. In the case of image compatibility information, the type value included in the type field 420 may be associated with image compatibility information. Sequence or bit-stream header fields are other examples of high system level fields.

Based on the value included in the type field 420, a device receiving the message 400 may determine whether to utilize the image encoding compatibility information provided for processing picture information. If a device is not configured to receive, decode, or render stereoscopic three-dimensional video data, the device may reject the stream. If the device is configured to receive, decode, or render stereoscopic three-dimensional video data, the device may extract the image encoding compatibility information from the header 412 and process the encoded picture(s) accordingly.

The image compatibility information header 412 shown in FIG. 4 also includes an image compatibility information field 422. The image compatibility information field 422 includes one or more values indicative of image compatibility information. For example, the image compatibility information field 422 may include a value at a known bit location which, when equal to a first value, indicates the video data includes frame-packed stereoscopic three-dimensional data and, when equal to a second value, indicates the video data does not include frame-packed stereoscopic three-dimensional data.

In-band transmission of image encoding compatibility information, such as via the message 400, may be applicable to many implementations. However, the syntax of the message may be codec-specific, for example, as discussed above with reference to DASH, PSS, and MBMS.

FIG. 5 illustrates a message diagram for a further exemplary encoding of image compatibility information. The format of the message 500 may comply with, for example, the real-time transport protocol standard as specified in RFC 3550 and/or its extension as specified RFC 5285. As such, the message 500 can be used for an out-of-band transmission of image compatibility information.

The message 500 may include a version field 502. The version field 502 may include a value indicating which version of a specification was used to generate the message 500. A receiving device may use the version information to determine the proper decoding scheme for the message 500.

The message 500 may include a padding field 504. The padding field 504 may include a value indicating whether the message 500 includes padding bits such as at the end. The message 500 may include a format field 506. The format field 506 may include a value indicating the message format type.

The message 500 may include a payload type field 508. For each message format type, one or more payload types may be defined. The payload type field 508 may be used to identify the format used to encode the payload.

In some implementations, the payload type field 508 may include a profile level identifier. A value of the profile level identifier may be assigned to indicate whether the payload includes stereoscopic three-dimensional video data. For example, the most significant bit (e.g., bit 7) of the second byte in profile-level-id as specified in RFC 6184 may be set to 1 to indicate that the payload (e.g., the video bit-stream) contains frame packing arrangement SEI messages. This bit may be set to 0 to indicate that the video bit-stream does not contain frame packing arrangement SEI messages. Note that legacy clients receiving a message with the payload type field 508 including a profile-level-id with the designated bit equal to 1 may reject the content. Alternatively, the bit equal to 1 indicates that the video bit-stream may contain frame packing arrangement SEI messages and the receiving device may adjust the decoding accordingly.

The message 500 may include a sequence number field 510. The sequence number field 510 may be used to identify the message 500 in relation to other packets. The sequence number field 510 may be used by a receiving device to detect packet loss and/or ensure proper order for received packets.

The message 500 may include a timestamp field 512. The timestamp field 512 may include a value identifying an absolute or relative point in time associated with the received video data. The message 500 shown in FIG. 5 includes a source identifier field 514. The source identifier field 514 may include a value identifying a synchronization source identifier of the source stream for the message 500. The message 500 may include one or more contributing source identifiers 518. The contributing source identifiers 518 indicate sources which may contribute content and/or information to the stream associated with the message 500.

The message 500 also includes extension header information. The extension header information may be a one byte header, two byte header, or other quantity of bytes header. In the message 500 shown in FIG. 5, three fields are included for each extension header information element, namely an extension header identifier field 520, an extension header length field 522, and an extension header field 524. The extension header identifier field 520 includes a value identifying the type of extension header information included in this element. The extension header identifier may be specified during session negotiation such as via an extension map (e.g., extmap) attribute. An example extmap attribute is "urn:ietf:params:rtp-hdrext:avc-compat." The extension header length field 522 includes a value indicating the length of the information included in the extension header field 524. The extension header field 524 includes the information associated with extension header identifier.

The extension header field 524 may be used to identify image compatibility information as shown in FIG. 5. The extension header field 524 may include a value identifying the presence of three-dimensional video data, type of three-dimensional data, and/or frame-packing format utilized to encode the video data. In some implementations, the extension header field 524 may include a multi-field value including several image compatibility values in a single extension header field.

If the message 500 does not include image compatibility information, a receiving device may be configured to extract the payload and process the image data via traditional methods. In some implementations, if the message 500 does not include image compatibility information, a receiving device may infer the same image compatibility information as a previously received message which included such information. For example, the inference may include storing a first image compatibility information in association with a sender device identifier (e.g., MAC address, MEID, IP address). When a subsequent message is received from the same sender device, the image compatibility information previously received may be applied to the subsequent message. Other or additional association information may be used to generate the inference such as a session identifier, a token, a media identifier, user name, and the like.

In some real-time streaming implementations, prior to receiving the message 500, a session may be established between the sending device and a receiver device. In such implementations, the session negotiation messaging may include image compatibility information for video which will be transmitted during the session. The receiving device may be configured to apply the default image compatibility information unless otherwise specified via subsequent messaging.

Another example service which may be used is multimedia broadcast and multicast service (MBMS). As MBMS may be conveyed via RTP, the image compatibility information for MBMS multimedia data may be conveyed similarly to the way the information is conveyed in RTP described, for example, in FIG. 5.

Figure 6:
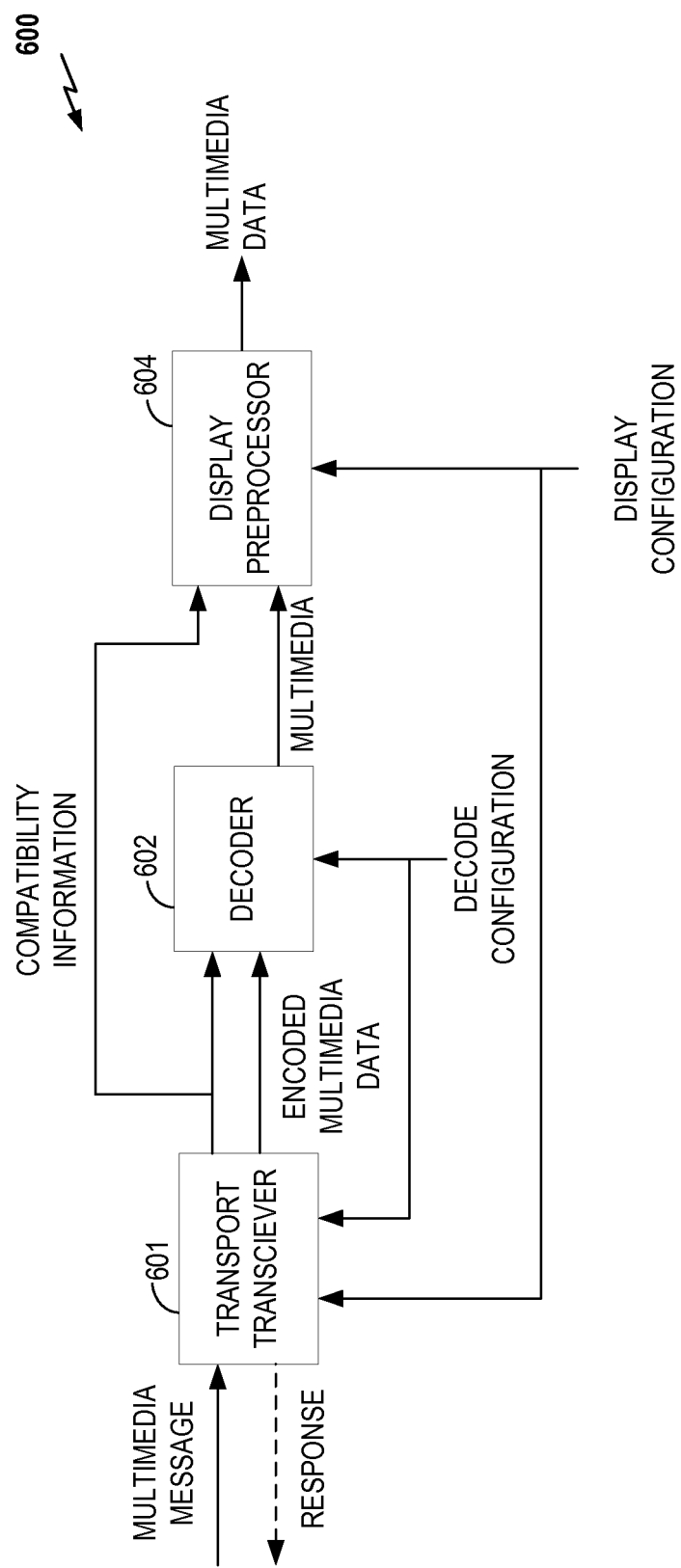
FIG. 6 illustrates a functional block diagram of an exemplary decoding device.

FIG. 6 illustrates a functional block diagram of an exemplary decoding device. The decoding device 600 may be included in the destination device 16. The decoding device 600 shown includes a transport transceiver 601, a decoder 602, and a display preprocessor 604.

The transport transceiver 601 may be configured to obtain the multimedia message, such as that shown in FIG. 4. The transport receiver 601 may be further configured to obtain the image compatibility information from a first portion of the multimedia message and the encoded multimedia data from a second portion of the multimedia message. The transport receiver 601 may provide the encoded multimedia data to the decoder 602. The transport receiver 601 may also provide the image compatibility information to one or more of the display preprocessor 604 and the decoder 602.

The transport transceiver 601 is further configured to generate and transmit responses messages. The response messages may be transmitted to a device which provided the multimedia message. The response may acknowledge receipt of the multimedia message. The response may acknowledge the decoding device 600 can decode the multimedia message and/or the encoded multimedia data included in the payload. The transport transceiver 601 may determine whether the decoding device 600 can decode and render the received multimedia message by comparing information included in the multimedia message to the decode configuration and display configuration, respectively. For example, if the image compatibility information includes a value indicating frame-packed stereoscopic three-dimensional video data is included in the payload, the decode configuration for the decoding device may include a value associated with a decoding process which can extract frame-packed stereoscopic three-dimensional video data. In such implementations, the response may include a message indicating the decoding is possible for the multimedia message.

In some implementations, the decode configuration may not include compatible decoding information. In such implementations, the transport transceiver 601 may be configured to generate a response message indicating the decoding device 600 cannot decode the received multimedia message. The response message may further include the supported decoding schemes.

Decoding is one part of the decoding device 600 functionality. The decoding device 600 may also be configured to prepare the multimedia for presentation. In such implementations, the decoding device 600 may be configured to decode the multimedia data, but the destination display may not be configured to display the multimedia data type received. For example, the decoder 602 may be configured to decode frame-packed stereoscopic three-dimensional data, but the display device may be a two-dimensional monitor. In such implementations, the transport transceiver 601 may generate a response message indicating the decoding for three-dimensional data is possible, but the display will be in two dimensions. This allows the sending device to make a determination as to whether it should continue transmitting frame-packed stereoscopic three-dimensional data, for example, or switch to a different encoding format which is supported by the target display.

The decoder 602 may receive the encoded multimedia data. The encoded multimedia data may be encoded in one or more of the ways described above. The decoder 602 may receive the image compatibility information. The image compatibility information may be used as part of the decoding process. For example, the image compatibility information may be used to configure a decoding pipeline for the encoding used to generate the encoded multimedia data. This can include reserving a video buffer.

The decoder 602 may also receive a decode configuration input. The decode configuration input may identify the decoding scheme to be applied. The decode configuration input may be provided once and used for all multimedia streams. The decode configuration input may be dynamic and provided for each encoded multimedia data. In a dynamic configuration, the decode configuration may be selected based at least in part on the received multimedia data, one or more characteristics of the source device 12 (e.g., power, processing capabilities, load), one or more characteristics (e.g., power, processing capabilities, load, coupling with source device) of the destination device 16, and/or other information available to the destination device 16.

The decoder 602 provides the decoded multimedia data as an output. As shown in FIG. 6, the multimedia data may be provided to the display preprocessor 604. The display preprocessor 604 may be configured to adjust the multimedia data based at least in part on the compatibility information and/or the decoded multimedia.

The display preprocessor 604 may also receive a display configuration input. The display configuration input may include values such as an orientation for the target display, dimensions of the target display, a preference for whether to display in two or three dimensions, and the like. Accordingly, the display preprocessor 604 may selectively adjust the output picture from the decoder 602 before the picture is displayed, depending on the user preference, system configuration, or the like. Display preprocessing may include color correction, time correction, aspect correction, scaling, and/or cropping the output picture to fit the target display size.

Figure 7:
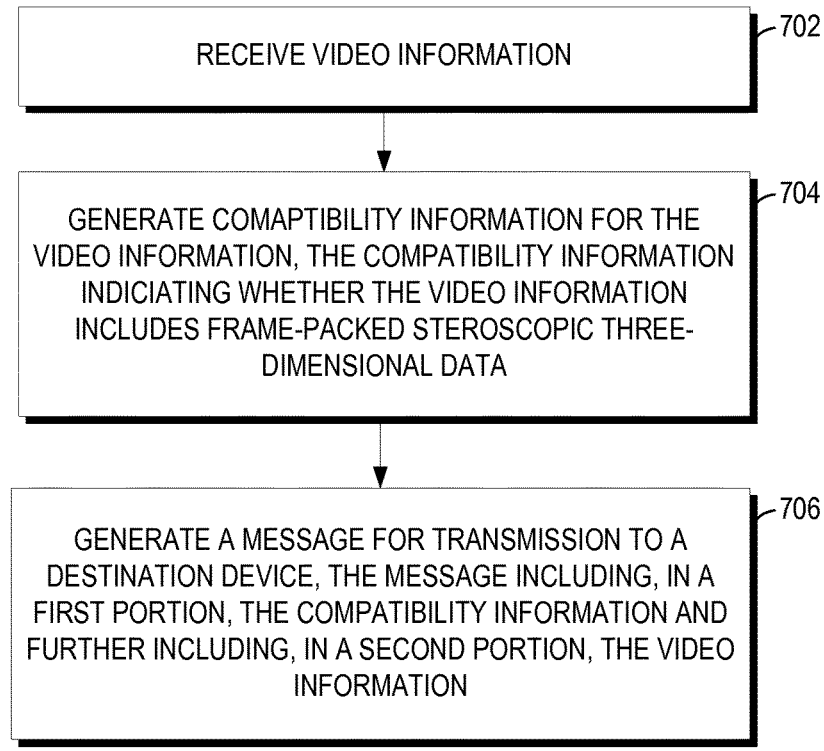
FIG. 7 shows a process flow diagram for an example of a method of encoding video information.

FIG. 7 shows a process flow diagram for an example of a method of encoding video information. The method shown in FIG. 7 may be implemented in one or more of the devices described herein, such as the video coding device shown in FIG. 2 or the encoding device shown in FIG. 3.

At node 702, video information is received. In some implementations receiving the video information may include retrieving at least a portion of the video information from a memory. In some implementations, receiving the video information may include receiving a message via a network including the video information. For example, the video information may be streamed via a wireless communication channel The received video information may be temporarily stored in whole, or in part, in a memory for further processing.

At node 704, compatibility information for the video information is generated by a processor of an electronic device. The compatibility information indicates whether video information includes frame-packed stereoscopic three-dimensional data.

At node 706, a message for transmission to a destination device is generated. The message includes, in a first portion, the compatibility information. The message also includes, in a second portion, the video information. The compatibility information indicates whether the video information includes frame-packed stereoscopic three dimensional video.

As one example, the compatibility information may be included in a transport layer header field of a message while the image data may be included in the payload. While the entire message may be encoded, the header field may be independently encoded from the payload. A receiving device can interrogate the header field for an initial indication of the compatibility information for the image data included in the payload. If the compatibility information indicates the image data includes stereoscopic three-dimensional frame packed data, the receiving device may alter the subsequent processing of the message. For instance, the receiving device may refrain from processing/decoding the payload. As another example, in some implementations, the receiving device may route the payload to a specially configured decoder which provides enhanced decoding of stereoscopic three-dimensional frame packed data.

By avoiding processing of the image data, a receiving device which cannot process stereoscopic three-dimensional frame packed data from beginning the decoding process which can include expending precious system and network resources. Based on the compatibility information, the receiving device can dynamically adjust to accept a variety of video formats, some of which may come into service after the device was manufactured. This can extend the period of time the device is usable in rapidly developing technology spaces such as video and multimedia.

Figure 8:
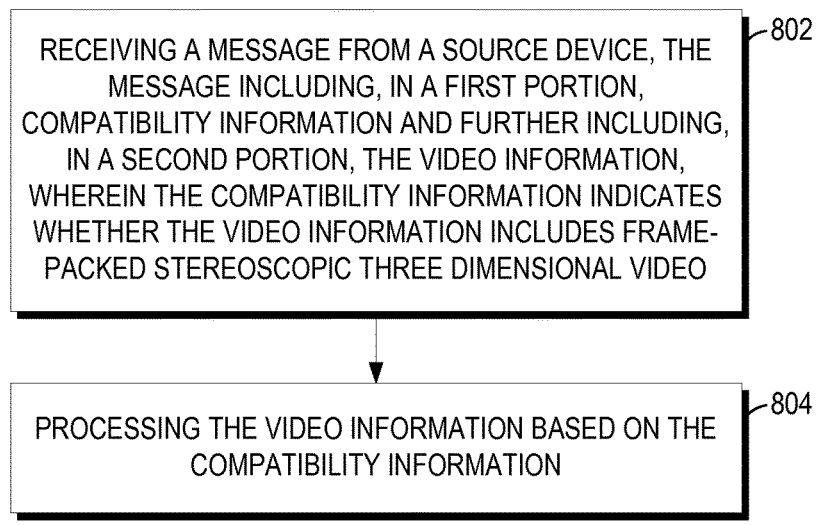
FIG. 8 shows a process flow diagram for an example of a method of decoding video information.

FIG. 8 shows a process flow diagram for an example of a method of decoding video information. The method shown in FIG. 8 may be implemented in one or more of the devices described herein, such as the video coding device shown in FIG. 2 or the decoding device shown in FIG. 6.

At node 802, a message is received from a source device. The message includes, in a first portion, compatibility information. The message also includes, in a second portion, the video information. The compatibility information indicates whether said video information includes frame-packed stereoscopic three dimensional video. At node 804, the video information is processed based on the compatibility information. The processing may include decoding, setting up a decoding pipeline, configuring a decoder, reserving system resources (e.g., power, processor, communication bandwidth), and the like. In some implementations, processing may include rejecting further communications related with the video information when the compatibility information indicates frame-packed three-dimensional video data is included and the receiving decoder does not support such video data.

Figure 9:
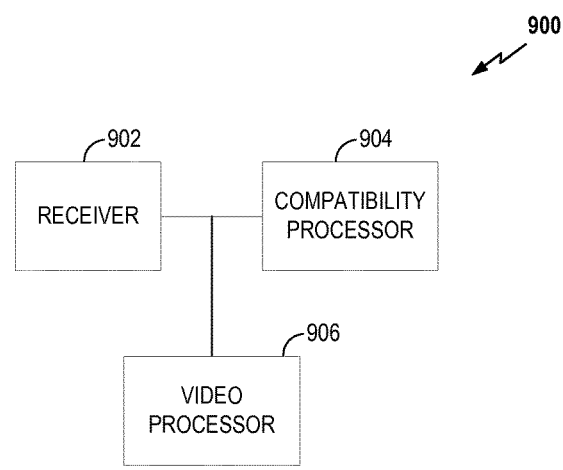
FIG. 9 shows a functional block diagram for an example of a device for coding video information.

FIG. 9 shows a functional block diagram for an example of a device for coding video information. The device 900 includes several features useful for describing certain aspects discussed above. It will be understood that a coding device may include additional elements (e.g., circuitry) which perform the functions of a coding device, such as a mobile smart-phone, a tablet computer, a laptop computer, gaming console, set-top-box, personal computer or the like.

The device 900 includes a receiver 902. The receiver 902 may include one or more of an antenna, a network interface, a network adapter, a signal processor, or memory circuits including non-volatile memory circuits (e.g., EEPROM, FLASH, etc.). The memory 902 may be configured to store video information such as image data. The storage may include storing all or a portion of the video information. In some implementations, means for receiving video information may include the receiver 902.

The device 900 also includes compatibility processor 904. The compatibility processor 904 is configured to determine compatibility information associated with video information. The compatibility processor 904 may include one or more of a data receiver configured to receive the video information, a parser configured to extract the compatibility information from the video information, and a configuration set including one or more configuration parameters for the compatibility processor 904. The parser may include a transport layer parser and a payload parser. In some implementations, means for determining compatibility information associated with video information include the compatibility processor 904.

As shown in FIG. 9, the device 900 also includes a video coding processor 906. The video coding processor 906 is configured to process the video information based on the determined compatibility information. The video coding processor 906 may include one or more of an encoder, a decoder, a display, and a transceiver. In some implementations, means for processing the video information include the video coding processor 906.

As a further example application of the aspects described, some destination devices may be configured to use real-time transport protocol packet switch stream streaming. The destination devices may be configured to receive, decode, and render certain formats such as video data including frame-packing arrangement SEI messages. In such implementations, the receiving, decoding, and rendering of the video bit-stream may be expedited upon identification of the image compatibility information. For example, when the image compatibility information is detected, frame packing arrangement SEI messages can be expected to follow. As such, the destination device may prepare to process the video bit-stream according to and/or assuming one or more of the following: the syntax element frame_packing_arrangement_type has one of the defined values: 3 for Side-by-Side, 4 for Top-and-Bottom; the syntax element quincunx_sampling_flag is equal to 0; the syntax element content_interpretation_type is equal to 1; the syntax elements spatial_flipping_flag is equal to 0; the syntax element field_views_flag is equal to 0; the syntax element current_frame_is_frame0_flag is equal to 0.

In some implementations, when an access unit contains a frame packing arrangement SEI message ("message A") and the access unit is neither an IDR access unit nor an access unit containing a recovery point SEI message, one or more of the following constraints may apply. First, there may be another access unit that precedes the access unit in both decoding order and output order and that contains a frame packing arrangement SEI message B. Second, the two frame packing arrangement SEI messages A and B shall have the same value for the syntax element frame_packing_arrangement_type.

Such destination devices may include a video buffer model for certain encoding formats. For example, if H.263 encoding is detected, a video buffer model may be initialized for the decoding. Not all encoding formats may use a buffer. For example, no buffer may be used for H.264 (AVC) encoded video.

The H.264 (AVC) decoder in a PSS client may be configured to start decoding immediately when it receives data (even if the stream does not start with an IDR access unit). Alternatively, the decoding may begin no later than when the device receives the next IDR access unit or the next recovery point SEI message, whichever is earlier in decoding order. Note that when the interleaved packetization mode of H.264 (AVC) is in use, de-interleaving is done normally before starting the decoding process. The decoding process for a stream not starting with an IDR access unit can be the same as for a valid H.264 (AVC) bit-stream. However, the client shall be aware that such a stream may contain references to pictures not available in the decoded picture buffer.

A PSS client supporting H.264 (AVC) may be configured to ignore any VUI HRD parameters, buffering period SEI message, and picture timing SEI message in H.264 (AVC) streams or conveyed in the "sprop-parameter-sets" MIME/SDP parameter. Instead, a PSS client supporting H.264 (AVC) can follow buffering parameters conveyed in SDP, and in RTSP. A PSS client supporting H.264 (AVC) shall also use the RTP timestamp or NALU-time of a picture as its presentation time, and, when the interleaved RTP packetization mode is in use, follow the "sprop-interleaving-depth", "sprop-deint-buf-req", "sprop-init-buf-time", and "sprop-max-don-diff" MIME/SDP parameters for the de-interleaving process. However, if VUI HRD parameters, buffering period SEI messages, and picture timing SEI messages are present in the bit-stream, their contents may not contradict any of the parameters mentioned in the previous sentence.

As noted above, RTP may also be used to deliver MBMS multimedia. In such implementations, similar image compatibility information may be specified as discussed above.

When H.264 (AVC) is used in the MBMS streaming delivery method, H.264 (AVC) parameter sets may be transmitted within the SDP description of a stream such as by using sprop-parameter-sets MIME/SDP parameter. Some implementations may be configured to avoid reuse of any parameter set identifier value that appeared previously in the SDP description or in the RTP stream. However, if a sequence parameter set is taken into use or updated within the RTP stream, it may be contained at least in each IDR access unit and each access unit including a recovery point SEI message in which the sequence parameter set is used in the decoding process. If a picture parameter set is taken into use or updated within the RTP stream, it may be contained at the latest in the first such access unit in each entry sequence that uses the picture parameter set in the decoding process, in which an entry sequence is defined as the access units between an IDR access unit or an access unit containing a recovery point SEI message, inclusive, and the next access unit, exclusive, in decoding order, which is either an IDR access unit or contains a recovery point SEI message.

An H.264 (AVC) decoder included an MBMS client may be configured to start decoding immediately when it receives data (even if the stream does not start with an IDR access unit). Alternatively, the MBMS client may be configured to start decoding no later than when it receives the next IDR access unit or the next recovery point SEI message, whichever is earlier in decoding order. Note that when the interleaved packetization mode of H.264 (AVC) is in use, de-interleaving is normally done before starting the decoding process. The decoding process for a stream not starting with an IDR access unit shall be the same as for a valid H.264 (AVC) bit-stream. However, the client may be aware that such a stream may contain references to pictures not available in the decoded picture buffer.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, electronic device(s) or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers.

In some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Certain aspects described may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Similarly, the messages described above include one or more fields which may be used in various implementations. The messages may include additional fields, fewer fields, and/or alternative field arrangements without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A device for decoding video information, the device comprising:
 a receiver configured to receive a message, the message including a header field and an image payload field, wherein the header field of the message includes compatibility information, wherein the image payload field of the message includes the video information, the video information including one or more frames of image data, and wherein the compatibility information indicates whether the video information includes frame-packed stereoscopic three dimensional video;
 a memory configured to store the message; and
 a processor in communication with the memory, the processor configured to:
  receive the message from the memory;
  determine the compatibility information based on a most significant bit in a second byte of a profile compatibility parameter associated with the message including the video information; and
  determine, based on the compatibility information, whether the image payload field of the message including the video information is decodable by the device, wherein the header field is decodable using a first version a codec, and wherein the image payload field is not decodable using the first version of the codec.

2. The device of claim 1, wherein the message comprises a high system level message.

3. The device of claim 2, wherein the high system level message comprises one of a sequence level message or a bit-stream level message.

4. The device of claim 3, wherein the high system level message comprises session description protocol (SDP) for real-time transport protocol (RTP) within the packet switch streaming service (PSS) message.

5. The device of claim 1, wherein the processor is further configured to transmit a second message indicating whether the video information is accepted based at least in part on the whether the image payload field of the message including the video information is decodable by the device.

6. The device of claim 1, wherein the processor is further configured to, based on the most significant bit indicating that the video information contains or may contain at least one frame packing arrangement service extension information message:
 obtain decoding capabilities; and
 one of:
  provide the video information for decoding based on at least one of the decoding capabilities including a frame packing arrangement service extension message capability; or
  transmit a message rejecting the video information based on the decoding capabilities not including a frame packing arrangement service extension message capability.

7. The device of claim 1, further comprising a decoder.

8. The device of claim 1, wherein the device comprises at least one of a telephone, a computer, a tablet computer, a console, a digital video receiver, a digital video recorder, a handheld gaming console, a laptop computer, a mobile smart-phone, a personal computer, or a set-top box.

9. A method of encoding video information, the method comprising:
 receiving video information including one or more frames of image data;
 generating, via a processor of an electronic device, compatibility information for the video information, the compatibility information indicating whether the video information includes frame-packed stereoscopic three-dimensional data;
 setting a most significant bit in a second byte of a profile compatibility parameter associated with the video information equal to a first value based on the video information not containing at least one frame packing arrangement service extension information message or setting the most significant bit to a second value based on the video information containing or maybe containing at least one frame packing arrangement service extension information message; and
 transmitting a message including, in a header field of the message, the compatibility information and further including, in an image payload field of the message, the video information, wherein the header field is decodable using a first version a codec, and wherein the image payload field is not decodable using the first version of the codec.

10. The method of claim 9, further comprising including the compatibility information at a high system level portion of the message.

11. The method of claim 10, wherein the high system level comprises one of a sequence level or a bit-stream level.

12. The method of claim 10, wherein the high system level portion comprises a session description protocol (SDP) for real-time transport protocol (RTP) based packet switch stream (PSS) streaming message.

13. The method of claim 9, further comprising:
 generating a request for the compatibility information, the request based on at least a portion of the video information;
 transmitting the request for compatibility information; and
 receiving a response including the compatibility information.

14. The method of claim 9, wherein the compatibility information is generated based on based on at least one of image data included in the video information, a configuration for the device, or an identifier for a capture device that provided the video information.

15. The method of claim 9, wherein the message is transmitted to a destination device, the method further comprising:
receiving, from the destination device, a second message rejecting the video information from the destination device; and
cancelling further transmission of the video information to the destination device.

16. A method of decoding video information, the method comprising:
receiving a message from a source device, the message including a header field and an image payload field, wherein the header field of the message includes compatibility information, wherein the image payload field of the message includes the video information, the video information including one or more frames of image data, and wherein the compatibility information indicates whether the video information includes frame-packed stereoscopic three dimensional video;
identifying the compatibility information based on a most significant bit in a second byte of a profile compatibility parameter associated with the message including the video information; and
determining, via a processor of an electronic device, whether the image payload field of the video information is decodable by the electronic device based on the compatibility information, wherein the header field is decodable using a first version a codec, and wherein the image payload field is not decodable using the first version of the codec.

17. The method of claim 16, wherein the message comprises a high system level message.

18. The method of claim 17, the high system level comprises one of a sequence level or a bit-stream level.

19. The method of claim 17, wherein the high system level message comprises a session description protocol (SDP) for real-time transport protocol (RTP) based packet switch stream (PSS) streaming message.

20. The method of claim 16, further comprising:
obtaining decoding capabilities; and
one of:
providing the video information for decoding based on at least one of the decoding capabilities including a frame packing arrangement service extension message capability; or
transmitting a message rejecting the video information based on the decoding capabilities not including a frame packing arrangement service extension message capability.

21. A non-transitory computer-readable medium comprising instructions executable by a processor of a device, the instructions causing the device to:
receive a message, the message including a header field and an image payload field, wherein the header field of the message includes compatibility information, wherein the image payload field of the message includes video information including one or more frames of image data, and wherein the compatibility information indicates whether the video information includes frame-packed stereoscopic three dimensional video;
identify the compatibility information based on a most significant bit in a second byte of a profile compatibility parameter associated with the message including the video information; and
determine, based on the compatibility information, whether the second portion of the message including the video information is decodable by the device, wherein the header field is decodable using a first version a codec, and wherein the image payload field is not decodable using the first version of the codec.

22. The medium of claim 21, further comprising:
obtaining decoding capabilities; and
one of:
providing the video information for decoding based on at least one of the decoding capabilities including a frame packing arrangement service extension message capability; or
transmitting a second message rejecting the video information based on the decoding capabilities not including a frame packing arrangement service extension message capability.

23. A device for encoding video information, the device comprising:
means for receiving video information, the video information including one or more frames of image data;
means for generating compatibility information for the video information, the compatibility information indicating whether video information includes frame-packed stereoscopic three-dimensional data, wherein the means for generating the compatibility information is configured to:
set most significant bit in a second byte of a profile compatibility parameter associated with the video information equal to a first value based on the video information not containing at least one frame packing arrangement service extension information message; and
set the most significant bit to a second value based on the video information containing or maybe containing at least one frame packing arrangement service extension information message; and
means for transmitting a message including, in a header field of the message, the compatibility information and further including, in an image payload field of the message, the video information, wherein the header field is decodable using a first version a codec, and wherein the image payload field is not decodable using the first version of the codec.

24. The device of claim 23, wherein the message is transmitted to a destination device, the device further comprising means for receiving a message from the destination device rejecting the video information, wherein the means for transmitting cancels all further transmissions of the video information to the destination device.

* * * * *